United States Patent
Li et al.

(10) Patent No.: US 7,743,179 B2
(45) Date of Patent: Jun. 22, 2010

(54) DATA TRANSMISSION METHODS (75) Inventors: Dejian Li, Taipei County (TW); Wenbin Li, Taipei County (TW)

(73) Assignee: Via Technologies, Inc., Taipei (TW)

( * ) Notice: Subject to any disclaimer, the term of this patent is extended or adjusted under 35 U.S.C. 154(b) by 522 days.

(21) Appl. No.: 11/693,752

(22) Filed: Mar. 30, 2007

(65) Prior Publication Data
US 2008/0244132 A1  Oct. 2, 2008

(51) Int. Cl.
*G06F 13/00* (2006.01)
(52) U.S. Cl. .......................... 710/33; 710/35
(58) Field of Classification Search ............. 710/33, 710/35
See application file for complete search history.

(56) References Cited
U.S. PATENT DOCUMENTS

| | | | |
|---|---|---|---|
| 4,370,712 A | 1/1983 | Johnson et al. | |
| 6,330,623 B1 * | 12/2001 | Wu et al. | 710/23 |
| 2004/0114690 A1 * | 6/2004 | Gordon et al. | 375/240.25 |
| 2006/0080478 A1 * | 4/2006 | Seigneret et al. | 710/22 |
| 2007/0162654 A1 * | 7/2007 | Miwa | 710/35 |

* cited by examiner

*Primary Examiner*—Alford W Kindred
*Assistant Examiner*—David E Martinez
(74) *Attorney, Agent, or Firm*—Thomas, Kayden, Horstemeyer & Risley (57) ABSTRACT

Data transmission systems and methods. The data transmission system comprises a bus, a slave, a master, and a master interface. The master transmits a request comprising transfer information comprising a start address and a length. The master interface receives the request from the master. The master interface determines a burst type of a first burst according to the transfer information, and transmits the first burst with the burst type to the slave via the bus, where the first burst is aligned to at least one address boundary of the slave. The master interface receives data corresponding to the first burst from the slave, and transmits the data to the master.

8 Claims, 7 Drawing Sheets

Start Address →

| Length (DW) ↓ | 0 | 1 | 2 | 3 | 4 | 5 | 6 | 7 | 8 | 9 | a | b | c | d | e | f |
|---|---|---|---|---|---|---|---|---|---|---|---|---|---|---|---|---|
| 1 | S | S | S | S | S | S | S | S | S | S | S | S | S | S | S | S |
| 2 | IN4 | IN4 | IN4 | IN4 | IN4 | IN4 | IN4 | IN16 | IN4 | IN4 | IN4 | IN8 | IN4 | IN4 | IN4 | IN4 |
| 3 | IN4 | IN4 | IN8 | IN8 | IN4 | IN4 | IN16 | IN16 | IN4 | IN8 | IN8 | IN8 | IN4 | IN4 | IN4 | IN4 |
| 4 | IN4 | IN8 | IN8 | IN8 | IN4 | IN16 | IN16 | IN16 | IN8 | IN8 | IN8 | IN8 | IN4 | IN4 | IN4 | IN4 |
| 5 | IN8 | IN8 | IN8 | IN8 | IN16 | IN16 | IN16 | IN16 | IN8 | IN8 | IN8 | IN8 | IN4 | IN4 | IN4 | IN4 |
| 6 | IN8 | IN8 | IN16 | IN16 | IN16 | IN16 | IN16 | IN16 | IN8 | IN8 | IN8 | IN8 | IN4 | IN4 | IN4 | IN4 |
| 7 | IN8 | IN8 | IN16 | IN16 | IN16 | IN16 | IN16 | IN16 | IN8 | IN8 | IN8 | IN8 | IN4 | IN4 | IN4 | IN4 |
| 8 | IN8 | IN16 | IN16 | IN16 | IN16 | IN16 | IN16 | IN16 | IN8 | IN8 | IN8 | IN8 | IN4 | IN4 | IN4 | IN4 |
| 9 | IN16 | IN16 | IN16 | IN16 | IN16 | IN16 | IN16 | IN16 | IN8 | IN8 | IN8 | IN8 | IN4 | IN4 | IN4 | IN4 |
| 10 | IN16 | IN16 | IN16 | IN16 | IN16 | IN16 | IN16 | IN16 | IN8 | IN8 | IN8 | IN8 | IN4 | IN4 | IN4 | IN4 |
| 11 | IN16 | IN16 | IN16 | IN16 | IN16 | IN16 | IN16 | IN16 | IN8 | IN8 | IN8 | IN8 | IN4 | IN4 | IN4 | IN4 |
| 12 | IN16 | IN16 | IN16 | IN16 | IN16 | IN16 | IN16 | IN16 | IN8 | IN8 | IN8 | IN8 | IN4 | IN4 | IN4 | IN4 |
| 13 | IN16 | IN16 | IN16 | IN16 | IN16 | IN16 | IN16 | IN16 | IN8 | IN8 | IN8 | IN8 | IN4 | IN4 | IN4 | IN4 |
| 14 | IN16 | IN16 | IN16 | IN16 | IN16 | IN16 | IN16 | IN16 | IN8 | IN8 | IN8 | IN8 | IN4 | IN4 | IN4 | IN4 |
| 15 | IN16 | IN16 | IN16 | IN16 | IN16 | IN16 | IN16 | IN16 | IN8 | IN8 | IN8 | IN8 | IN4 | IN4 | IN4 | IN4 |
| 16 | IN16 | IN16 | IN16 | IN16 | IN16 | IN16 | IN16 | IN16 | IN8 | IN8 | IN8 | IN8 | IN4 | IN4 | IN4 | IN4 |

DATA TRANSMISSION METHODS

BACKGROUND OF THE INVENTION

1. Field of the Invention

The disclosure relates generally to data transmission, and, more particularly to data transmission methods requesting specific length and address aligned bursts.

2. Description of the Related Art

Data transmission of memory is a key index of the performance of a computer system. It is a challenge for the hardware designer to improve the efficiency of the data transmission. For example, the operation software is used as the virtual address to indicate where the data are stored. Such a virtual address is mapped to a corresponding physical address which indicates where the data is in the hardware (memory). For the security and other reason, a data stored in the continuous virtual addresses may be divided to several data blocks which are mapped into different physical addresses. These data blocks are arranged randomly in the memory. It will cause more tasks to access such the data stored in the continuous virtual addresses and reduce the efficient in data transmission.

For example, the data transmission abovementioned is participated in the Advanced Microcontroller Bus Architecture (AMBA) which defines an on-chip bus standard. In AMBA, a variety of system components comprising a controller, memory and peripheral interfaces and others is coupled with buses thereon. In AMBA, high bandwidth buses such as Advanced High-performance Buses (AHB) are provided for data transfer between a plurality of masters and slaves. For example, a controller (master) can access a device (slave) such as memory via AHB. The device is a DMA (Direct Memory Access) type device supporting burst and pipelined data transfer procedures.

A data transfer procedure comprises grant, address/control and data cycles. In the grant cycle, a master first requests access to the bus, and an arbiter receives a request from the master and grants a master access to the master for transfer operations on the bus. In the address and control cycle, transfer information such as start address, direction and size for the transfer, and corresponding packet type are communicated, and data is presented in the data cycle. For example, one of the masters is granted to own the bus. The granted master can send data through the bus to a slave (write operation), or request a burst of data through the bus from a slave in an opposite direction (read operation). Similarly, one of the slaves is granted to own the bus. The granted slave can send data to be read by a master requesting the data.

Conventionally, if data with a specific length is requested, where the start address of the data is not address aligned (not on the double-word boundary (4DW/8DW/16DW)) from a memory, the master may use an unspecified length burst to request the data from the memory. Since the start address of the data is not address aligned, the master will request a burst across the address boundary, reducing the access performance. Since no length information is provided by the unspecified length burst, the slave efficiency is decreased. Additionally, the master may use more specified length bursts to request the data from the memory. The master must split a request into several small requests, reducing the efficiency of the bus. Similarly, since the start address of the data is not address aligned, the master will request a burst across the address boundary, reducing the access performance.

BRIEF SUMMARY OF THE INVENTION

Data transmission methods are provided.

In an embodiment of a data transmission method, a request comprising transfer information comprising a start address and a length is received from a master. A burst type of a first burst is determined according to the transfer information, where the first burst is aligned to at least one address boundary of the slave. The first burst with the burst type is transmitted to a slave via a bus. Data corresponding to the first burst is received from the slave, and transmitted to the master.

In an embodiment of a method of data transmission from a memory, the memory is divided into a plurality of sections and each section has a plurality of address boundaries with an data interval. If a request comprising a start address and a length of an accessing data for data transmission is received, a starting address boundary of a selected section is determined according to the start address, and an ending address boundary of the selected section is determined according to the start address and the length of the accessing data. According to the determined address boundaries, data from the starting address boundary to the ending address boundary is accessed, wherein the start address is within the starting address boundary and the ending address boundary.

Data processing systems and methods may take the form of program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Data processing systems and methods are provided.

Figure 1:
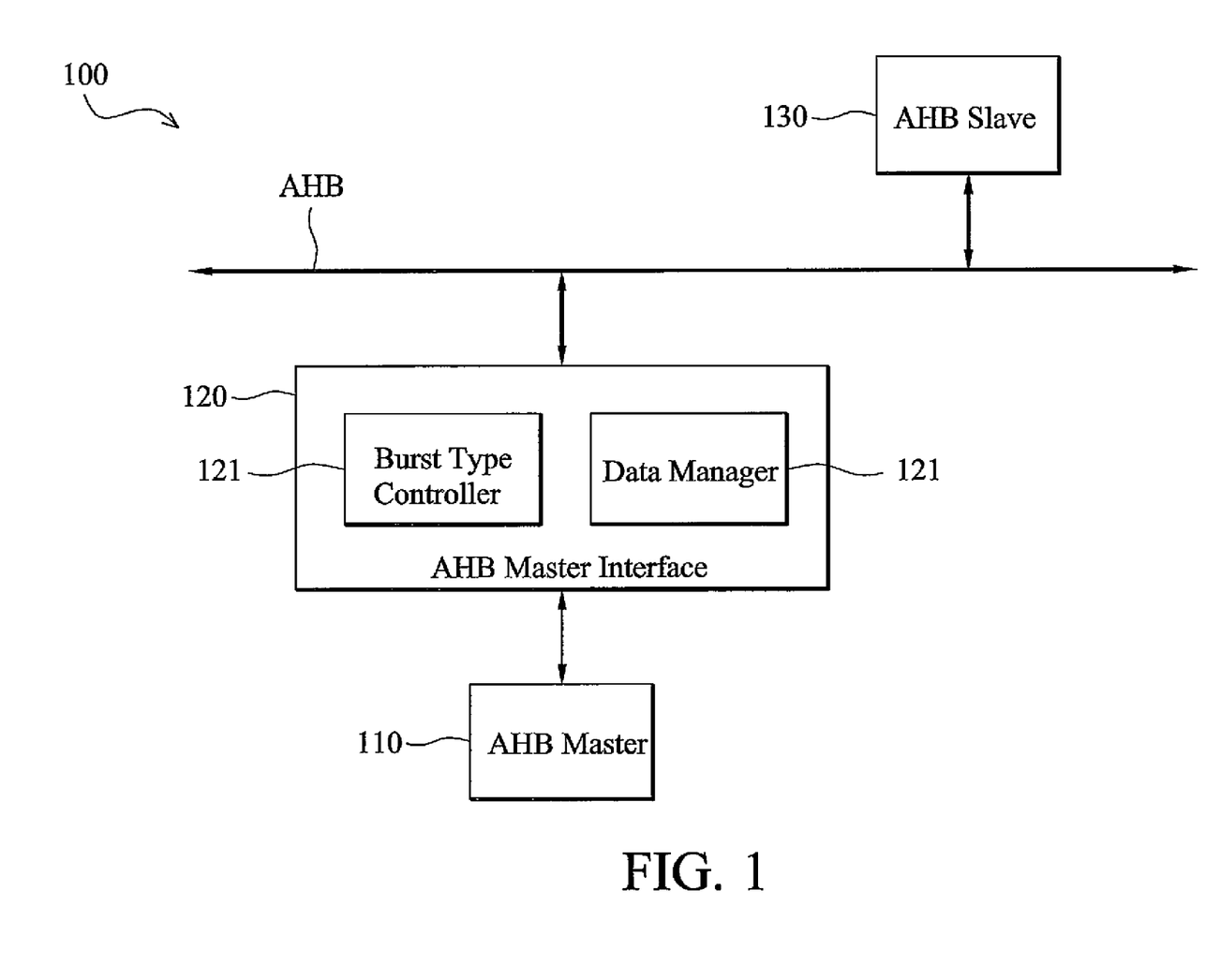
FIG. 1 is a schematic diagram illustrating an embodiment of a data processing system.

FIG. 1 is a schematic diagram illustrating an embodiment of a data processing system.

The data processing system 100 may be an AMBA system, comprises an AHB master 110 such as USB (Universal Serial Bus) host controller, an AHB master interface 120, and an AHB slave 130 such as memory. The AHB master 110 communicates with the AHB slave 130 via the AHB master interface 120 through the AHB. For example, the AHB master 110 can access (read/write) data from the AHB slave 130 via the AHB master interface 120. The AHB master interface 120 receives requests comprising transfer information from the AHB master 110, and generates and transmits bursts to the AHB slave 130. The AHB master interface 120 receives corresponding data from the AHB slave 130, and transmits data to the AHB master 110. The AHB master interface 120 comprises a burst type controller 121 and a data manager 122. The burst type controller 121 determines a burst type of at least one burst according to the transfer information comprising a start address and a length of the data to be access in the AHB slave 130. The data manager 122 discards extra data from the data received from the AHB slave 130 according to the transfer information.

Figure 2:
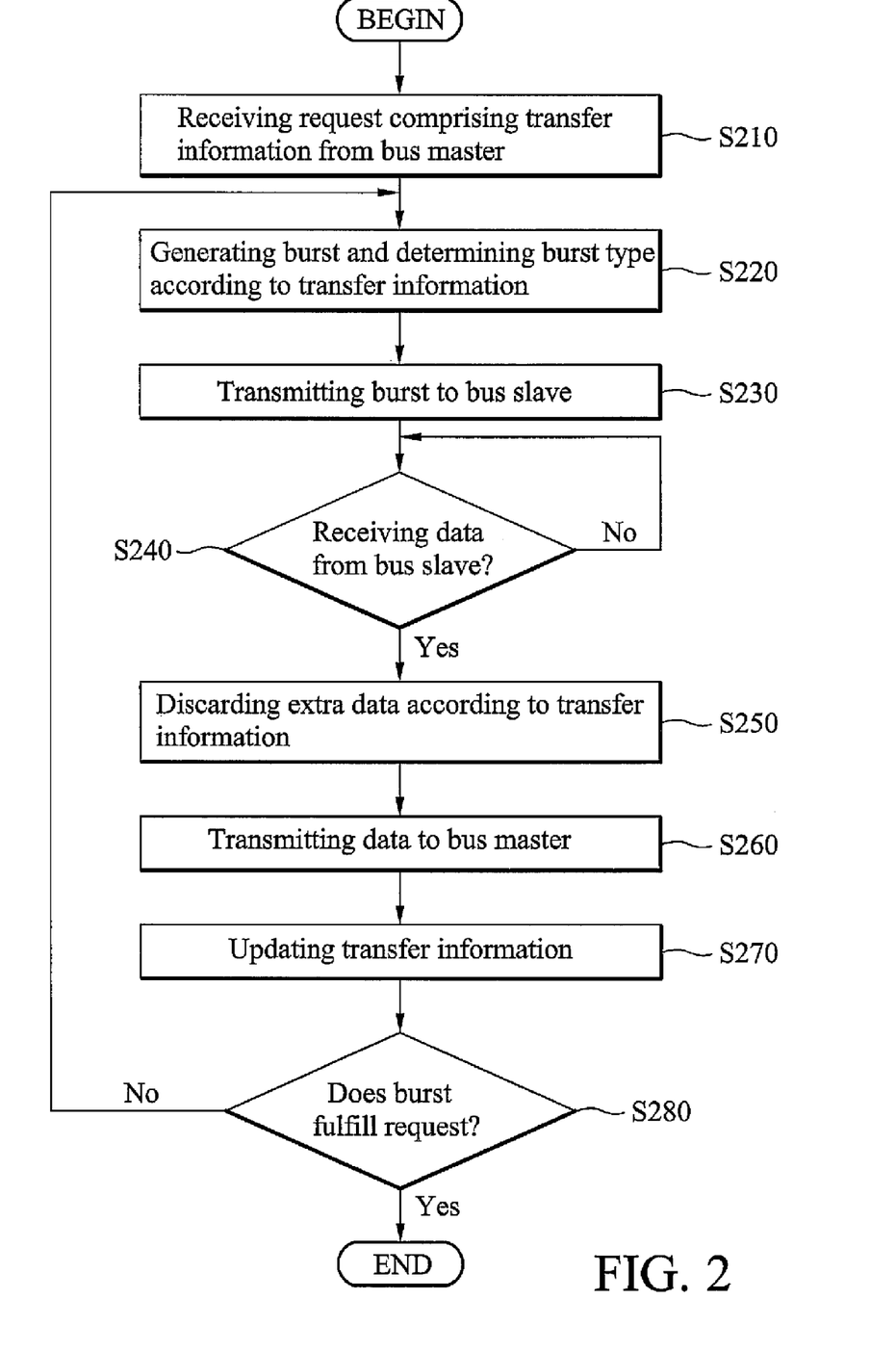
FIG. 2 is a flowchart of an embodiment of a data processing method.

FIG. 2 is a flowchart of an embodiment of a data processing method.

In step S210, a request comprising transfer information is received from a bus master (such as the AHB master 110). The transfer information comprises a start address and a length. In step S220, a burst is generated and a burst type of the burst is determined according to the transfer information. It is noted that the burst is aligned to at least one address boundary of the bus slave (such as the AHB slave 130). In some embodiments, the address boundary may be 4DW (Data Word), 8DW, and 16DW. It is understood that several bursts may be generated for a request. In step S230, the burst with the burst type is transmitted to the slave via a bus (such as the AHB). In step S240, it is determined whether data is received from the slave. If not, the step remains. If data corresponding to the burst is received from the slave, in step S250, extra data is found and discarded from the received data according to the transfer information. It is understood that if no extra data is in the received data, no data is discarded. In step S260, the data is transmitted to the master. In step S270, the transfer information is updated according to the burst. For example, the length of data to be accessed subtracts the data length of current burst, and the start address adds the data length of current burst. In step S280, it is determined whether the request is fulfilled by the burst (data transfer is complete), to determine whether the updated length equals 0. If so, the data transfer procedure is complete. If not, the procedure goes to step S220 until the data transfer procedure is complete. It is understood that, in some embodiments, the received data can be collected and transmitted to the master in a transmission.

Figure 3:
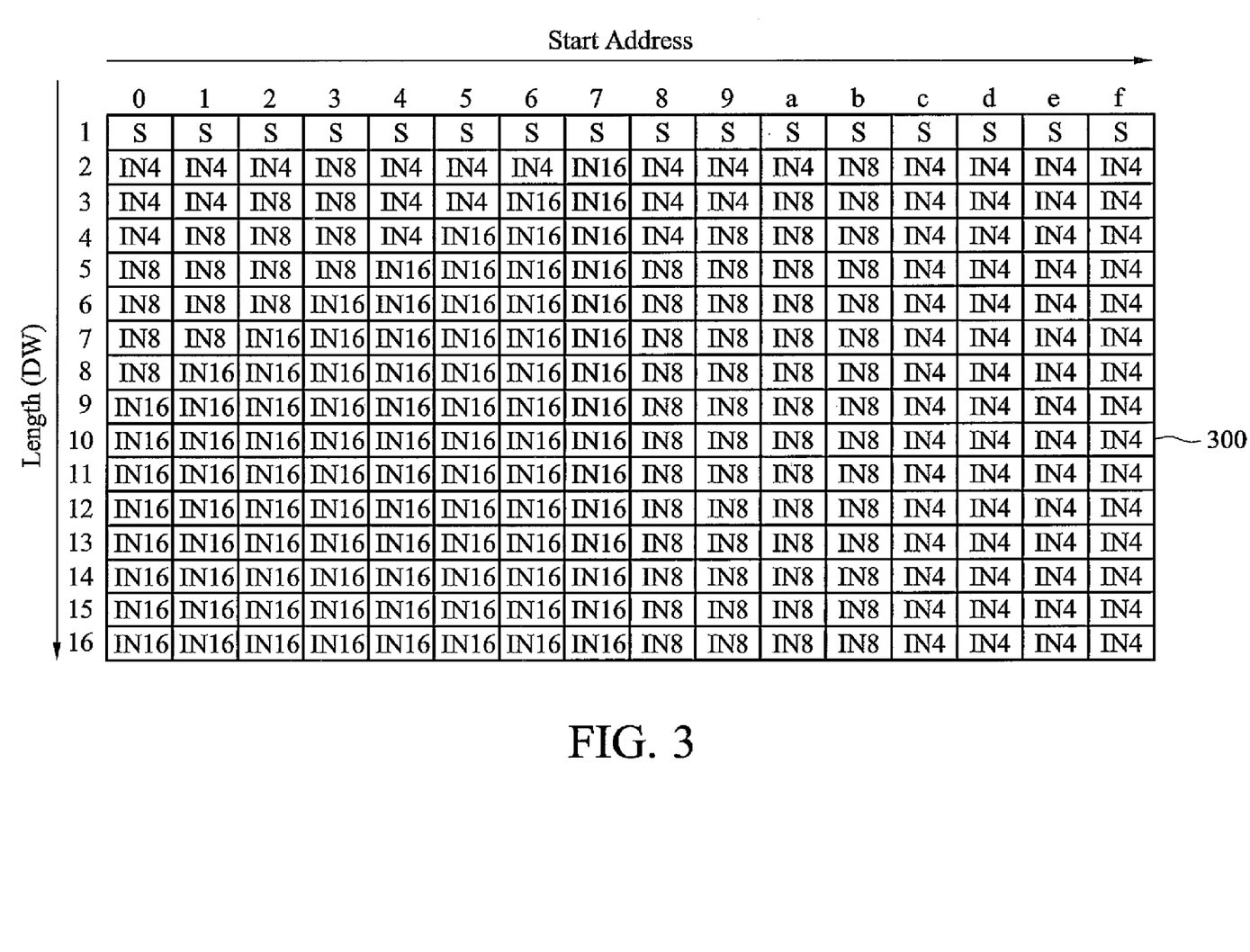
FIG. 3 show a table recording burst types corresponding to transfer information.

In some embodiments, the burst type controller 121 comprises a table 300 recording burst types corresponding to various transfer information, as shown in FIG. 3, where the row indicates the start address (low 4 bits), the column indicates the length (DW), and the intersection of row and column is the burst type of the burst. In table 300, S represents a burst (or a data transmission) with a length of one double word, IN4 represents a burst (or a data transmission) with a length of four double words (4DWs) from one address boundary, IN8 represents a burst (or a data transmission) with a length of eight double words (8DWs) from one address boundary, and IN16 represents a burst (or a data transmission) with a length of sixteen double words (16DWs) from one address boundary. Once the transfer information is received from the master, the burst type of a first burst can be determined by looking up the table according to the transfer information. Similarly, the burst type of at least one subsequent burst can be determined according to the updated transfer information. It is understood that the table in FIG. 3 is an example, and not limited thereto.

Figure 4:
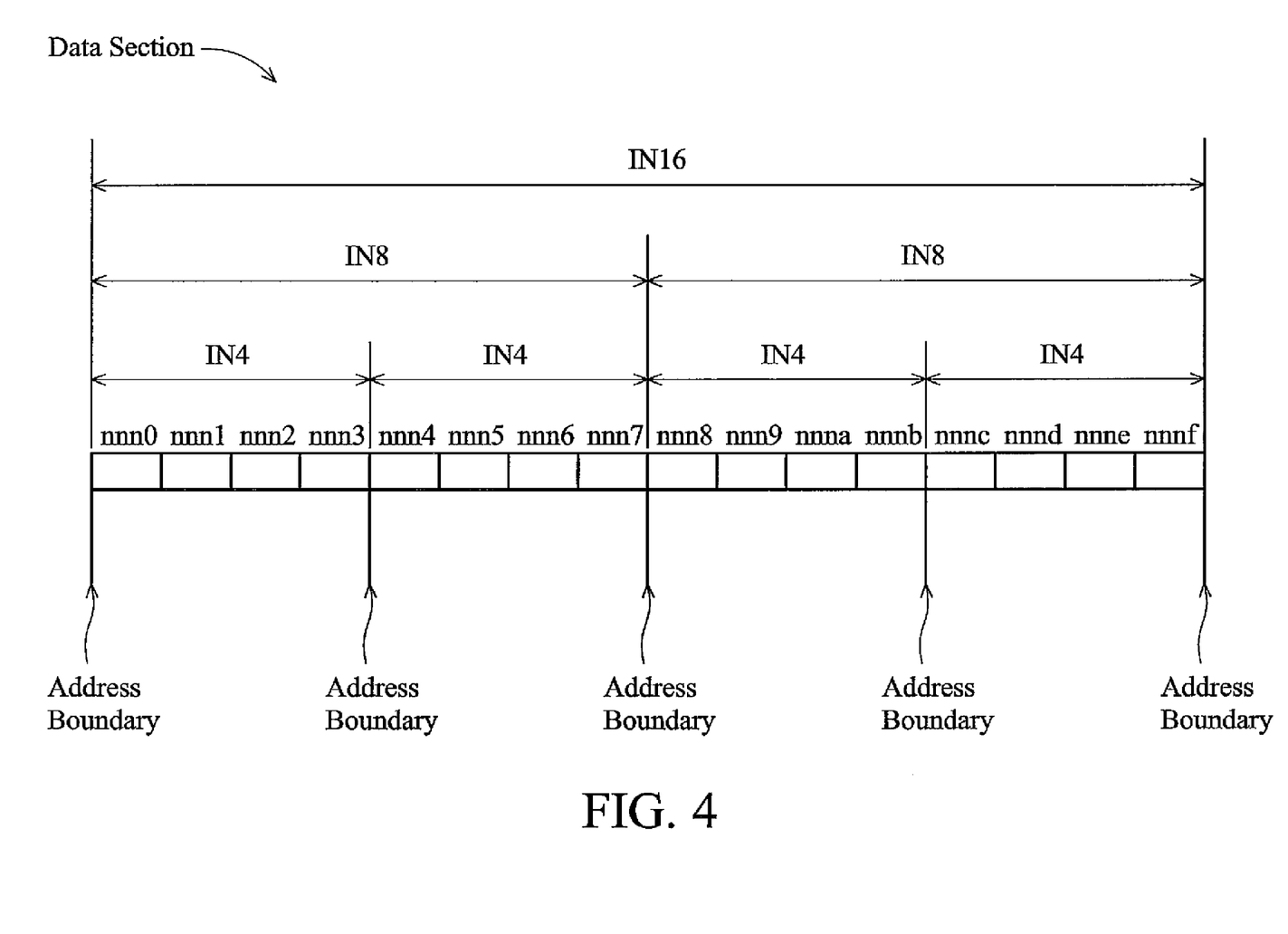
FIG. 4 is a schematic diagram illustrating an embodiment of section in a memory.

Please refer to FIG. 4, which is a schematic diagram of the section in a memory. The memory could be divided into several sections, and each section has several units serially arranged in a row. In the embodiment shown in FIG. 4, each unit is one double word (DW) data. For easy understood, the addresses for the section in FIG. 4 are nnn0, nnn1, nnn2, . . . , nnnf, where n is a hexadecimal number. For the efficiency in the data transmission, the address boundary is specified in the memory in accordance with the hardware design of the memory and the definition in the memory accessing protocol. In this embodiment, a IN16 burst is a burst with a length of sixteen double words (16DWs) from one address boundary, such as the burst with the address [nnn0-nnnf]. A IN8 burst is a burst with a length of eight double words (8DWs) from one address boundary, such as the burst with the address [nnn0-nnn7], or [nnn8-nnnf]. Similarly, a IN4 burst is a burst with a length of four double words (4DWs) from one address boundary, such as the burst with the address [nnn0-nnn3], [nnn4-nnn7], [nnn8-nnnb], or [nnnc-nnnf].

Figure 5A:
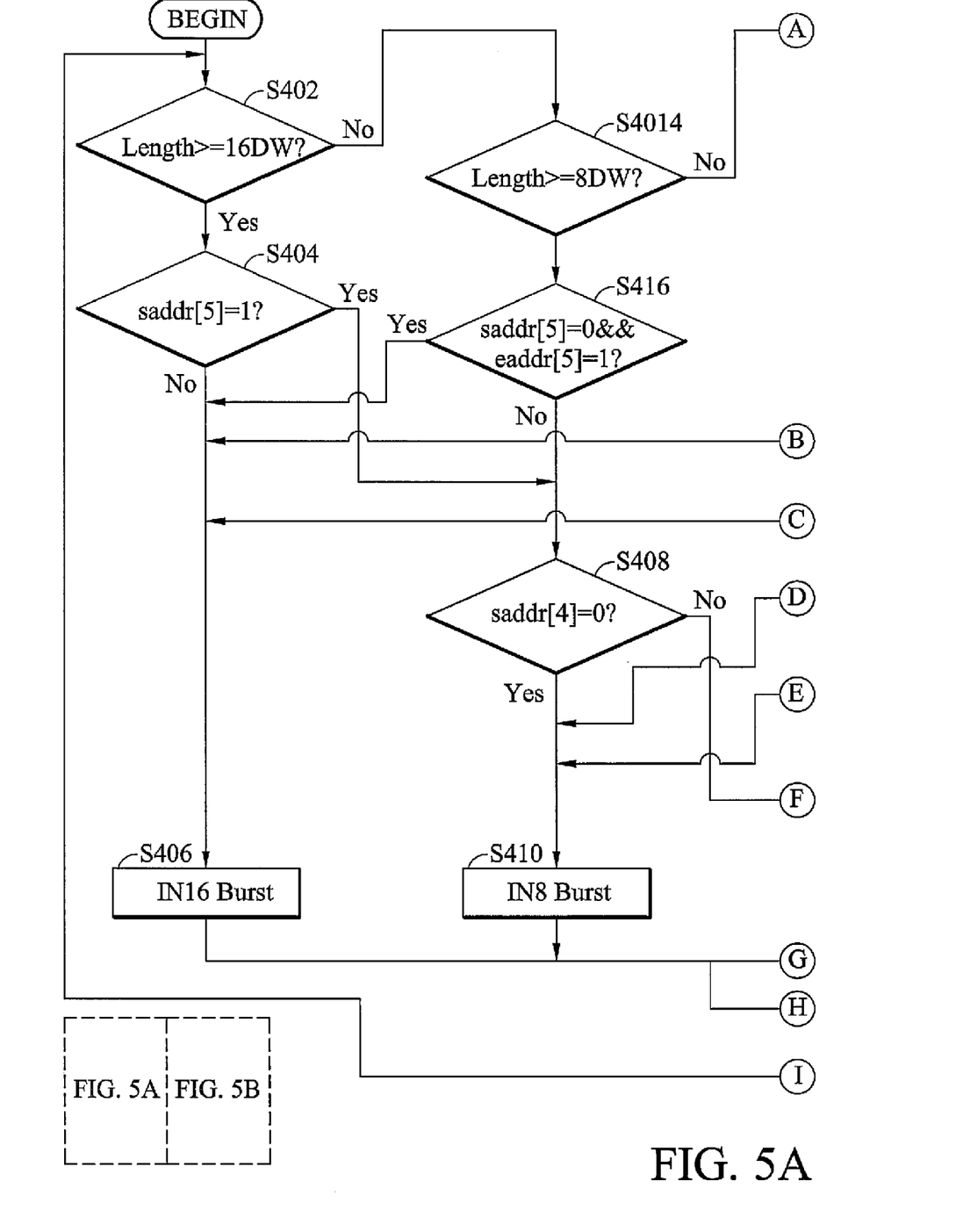
FIG. 5 is a flowchart of an embodiment of a data processing method.
Figure 5B:
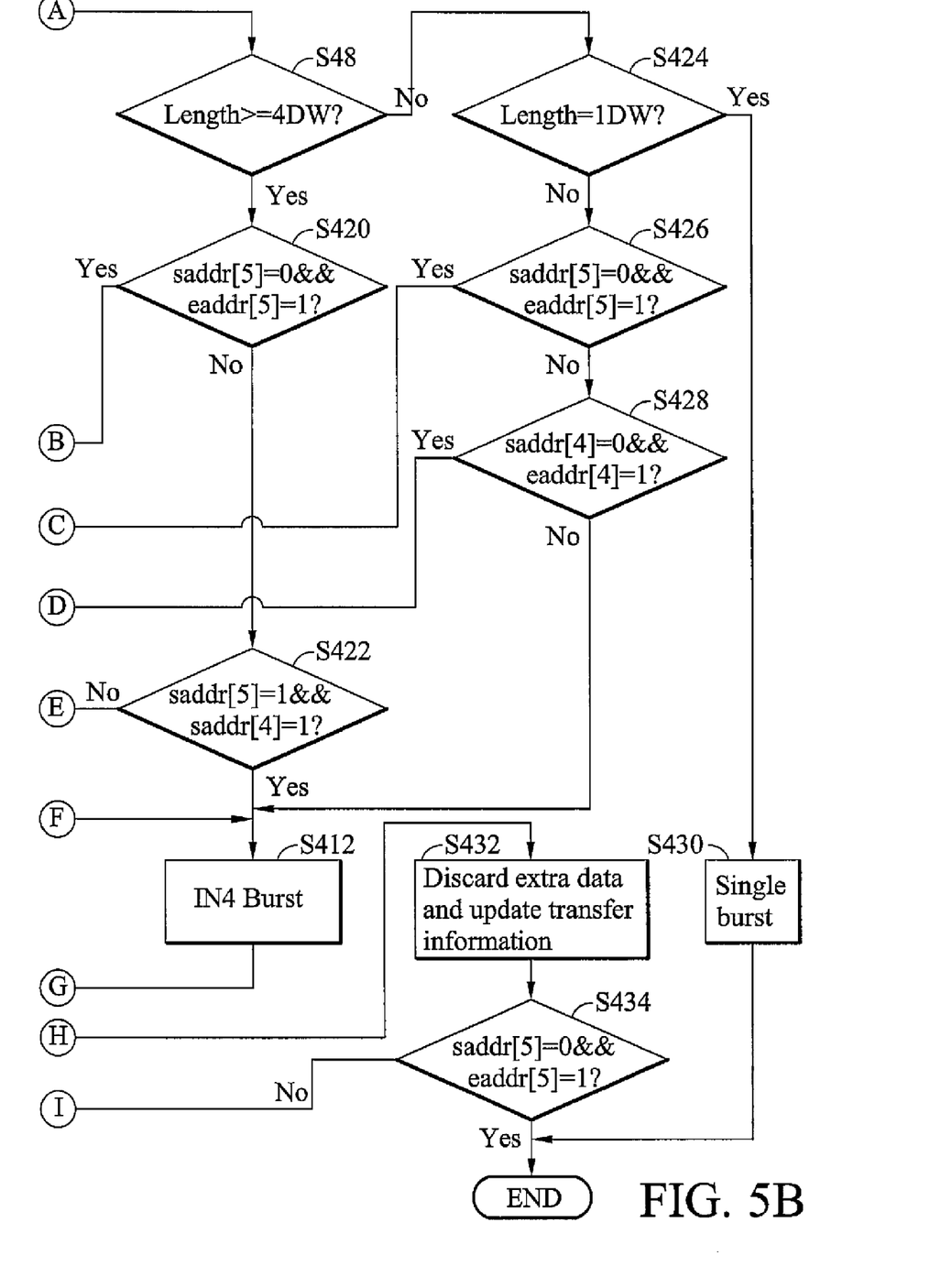

FIG. 5 is a flowchart of an embodiment of a data processing method. In this embodiment, the burst type controller 121 directly determines the burst type of a burst according to the transfer information.

In step S402, it is determined whether the length exceeds or equals 16DWs. If so, in step S404, it is determined whether a fifth low bit of the start address equals 1. If the fifth low bit of the start address does not equal 1, in step S406, the burst type of the burst is determined as the IN16 burst. If the fifth low bit of the start address equals 1 (Yes in step S404), in step S408, it is determined whether a fourth low bit of the start address equals 0. If so (Yes in step S408), in step S410, the burst type of the burst is determined as the IN8 burst. If not (No in step S408), in step S412, the burst type of the burst is determined as the IN4 burst. If the length does not exceed or equal 16DWs (no in step S402), in step S414, it is determined whether the length exceeds or equals 8DWs. If so, in step S416, it is determined whether the fifth low bit of the start address equals 0 and whether a fifth low bit of an end address equals 1, where the end address is the start address plus the length. If so (Yes in step S416), in step S406 the burst type of the burst is determined as the IN16 burst. If the fifth low bit of the start address does not equal 0 or the fifth low bit of the end address does not equal 1 (No in step S416), in step S408, it is determined whether the fourth low bit of the start address equals 0. If so (Yes in step S408), in step S410, the burst type of the burst is determined as the IN8 burst. If not (No in step S408), in step S412, the burst type of the burst is determined as the IN4 burst. If the length does not exceed or equal 8DWs (No in step S414), in step S418, it is determined whether the length exceeds or equals 4DWs. If so (Yes in step S418), in step S420, it is determined whether the fifth low bit of the start address equals 0 and whether the fifth low bit of the end address equals 1. If the fifth low bit of the start address equals 0 and the fifth low bit of the end address equals 1 (Yes in step S420), in step S406, the burst type of the burst is determined as the IN16 burst. If the fifth low bit of the start address does not equal 0 or the fifth low bit of the end address does not equal 1 (No in step S420), in step S422, it is determined whether the fifth low bit of the start address equals 1 and a fourth low bit of the start address equal 1. If so (Yes in step S422), in step S412, the burst type of the burst is determined as the IN4 burst. If not (No in step S422), in step S410, the burst type of the burst as the IN8 burst. If the length does not exceed or equal 4DWs (No in step S418), in step S424, it is determined whether the length equals 1DW. If the length does not equal 1DW (No in step S424), in step S426, it is determined whether the fifth low bit of the start address equals 0 and whether the fifth low bit of the end address equals 1. If so (Yes in step S426), in step S406, the burst type of the burst is determined as the IN16 burst. If the fifth low bit of the start address does not equal 0 or the fifth low bit of the end address does not equal 1 (No in step S426), in step S428, it is determined whether the fourth low bit of the start address equals 0 and the fourth low bit of the end address equal 1. If so (Yes in step S428), in step S410, the burst type of the burst is determined as the IN8 burst. If not (No in step S428), in step S412, the burst type of the burst is determined as the IN4 burst. If the length equals 1DW (Yes in step S424), in step S430, the burst type of the burst is determined as the single burst. It is noted that if the burst is a single burst, the procedure is complete. After the burst type is determined and corresponding data is then received, in step S432, extra data is determined and discarded, and the length is updated according to the burst. In step S434, it is determined whether the data transfer corresponding to the request finishes (the updated length equals 0). If not, the procedure goes to step S402. If so, the procedure is complete.

Figure 6:
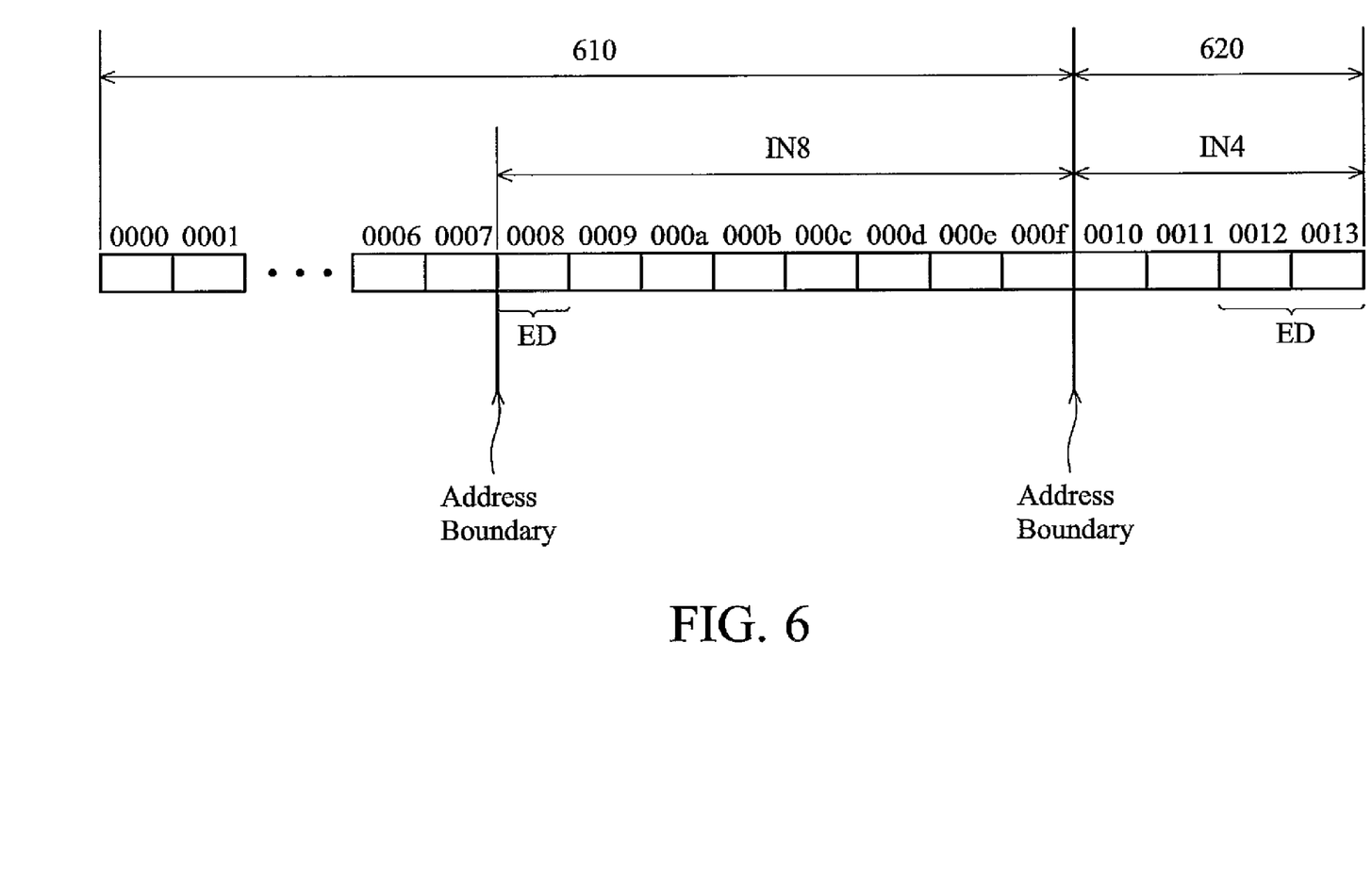
FIG. 6 shows an example of a data transmission from a memory.

FIG. 6 shows an example of data transmission from a memory. The first section 610 of the memory is from the address 0000 to the address 000f. The second section 620 of the memory is from the address 0010 to the address 001f. Each data address has the capacity of one double word (1DW). When a bus master want to access the data stored in address 0009-0011 of the memory, i.e. the data with a length of 9 double words (9DWs). The bus master is issued a request for data transmission to the bus interface. The request for data transmission comprises the transfer information, such as the start address of data is 0009 and the length of data is 9. The bus interface found the first section 610 where the start address is existed in and selected the starting address boundary which is in the end of the address 0007 and in the beginning of the address 0008. This is because the address boundary in the beginning of the address 0008 is the nearest one to the start address 0009. According to the start address and the length of the data, there are more data existing in the other section. Thus, the ending address boundary is selected as the end of the address 000f. According to the starting address boundary and the ending addressing boundary, the bus interface requests an IN8 burst to the memory, i.e. requests a data transmission from the address 0008 to 00f. Since the burst length is eight double words (8DWs) and the start address 0009, the bus interface knows that the accessing data includes the extra data (ED) with one double word (1DW) and the data accessing length is seven double words (7DWs). More particularly, the extra data (ED) is the data corresponding to the address 0008 received from the memory. After receiving the corresponding data from memory, the bus interface ignores the extra data (ED), and transmits the remaining data to the bus master. The bus interface also updates transfer information based on the data accessing length, i.e. the start address is updated as 0010, and the length is updated as 2. Repeating the previous step, the bus interface selects the second section 620 because the start address is 0010 is existing in the section 620. The starting address boundary is selected as the beginning of the address 0010 and the ending address boundary is selected as the end of the address 0013. Then, the bus interface requests an IN4 burst to access the data from the address 0010 to the address 0013. Similarly, the bus interface will ignore the extra data with 2 double words (2DWs) and transmit the remaining data to the bus master after receiving the corresponding data from the memory. Through the steps of this embodiment, the data accessing from the address 0009-0011 is achieved by one IN8 burst and one IN4 burst. Please note that both of the bursts are aligned to the address boundary.

When the master accesses the slave, at least one burst of specific length, such as single, IN4, IN8 and IN16 is generated, where the start address of the burst is address boundary aligned, for example, 4DW, 8DW, and 16 DW aligned. In the invention, the master does not need to split requests if the requests cross cache line and capacity such as 1K boundary. Additionally, the number of small requests is reduced, improving the bus efficiency and system performance.

Data processing systems and methods, or certain aspects or portions thereof, may take the form of program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for data transmission, comprising:
receiving a request comprising transfer information comprising a start address and a length from a master;
determining a burst type of a first burst according to the transfer information, where the first burst is aligned to at least one address boundary of a slave, wherein the burst type is one of a single burst, an increment 4 (IN4) burst, an increment 8 (IN8) burst, and an increment 16 (IN16) burst;
transmitting the first burst with the burst type to the slave via a bus;
receiving data corresponding to the first burst from the slave; and
transmitting the data to the master,
wherein the determination of the burst type of the first burst comprises the steps of:
checking whether the length exceeds or equals 16DWs (Double Words);
if so, checking whether a fifth low bit of the start address equals 1; and
if the fifth low bit of the start address does not equal 1, determining the burst type of the first burst as the IN16 burst.

2. The method of claim 1 further comprising:
determining whether extra data is in the data according to the transfer information; and
if so, discarding the extra data from the data.

3. The method of claim 1 further comprising:
determining whether the first burst fulfills the request;
if not, updating the transfer information according to the first burst;
determining the burst type of a second burst according to the updated transfer information;
transmitting the second burst with the burst type to the slave via the bus;
receiving data corresponding to the second burst from the slave; and
transmitting the data to the master.

4. The method of claim 1 wherein if the length does not exceed or equal 16DWs, the method further comprises:
checking whether the length exceeds or equals 8DWs;
if so, checking whether the fifth low bit of the start address equals 0 and whether a fifth low bit of an end address equals 1, where the end address is the start address plus the length;
if the fifth low bit of the start address equals 0 and the fifth low bit of the end address equals 1, determining the burst type of the first burst as the IN16 burst.

5. The method of claim 4 wherein if the fourth low bit of the start address does not equal 0, the method further comprises determining the burst type of the first burst as the IN4 burst.

6. The method of claim 4 wherein if the length does not exceed or equal 8DWs, the method further comprises:
  determining whether the length exceeds or equals 4DWs;
  if so, determining whether the fifth low bit of the start address equals 0 and whether the fifth low bit of the end address equals 1; and
  if the fifth low bit of the start address equals 0 and the fifth low bit of the end address equals 1, determining the burst type of the first burst as the IN16 burst.

7. The method of claim 6 wherein if the length does not exceed or equal 4DWs, the method further comprises:
  determining whether the length equals 1DW; and
  if so, determining the burst type of the first burst as the single burst.

8. The method of claim 7 wherein if the length does not equal 1DW, the method further comprises:
  determining whether the fifth low bit of the start address equals 0 and whether the fifth low bit of the end address equals 1; and
  if so, determining the burst type of the first burst as the IN16 burst.

* * * * *